(12) United States Patent
Moadus et al.

(10) Patent No.: US 8,725,703 B2
(45) Date of Patent: May 13, 2014

(54) MANAGEMENT OF AN INVENTORY OF WEBSITES

(75) Inventors: Elliott Moadus, Concord, NC (US);
Philip B. Glaeser, Charlotte, NC (US);
Charmian C. Proskauer, Newton Highlands, MA (US)

(73) Assignee: Bank of America Corporation, Charlotte, NC (US)

( * ) Notice: Subject to any disclaimer, the term of this patent is extended or adjusted under 35 U.S.C. 154(b) by 140 days.

(21) Appl. No.: 12/859,422

(22) Filed: Aug. 19, 2010

(65) Prior Publication Data

US 2012/0047161 A1 Feb. 23, 2012

(51) Int. Cl.
*G06F 7/00* (2006.01)
*G06F 17/00* (2006.01)

(52) U.S. Cl.
USPC .......................................................... 707/692

(58) Field of Classification Search
USPC ......................................... 707/692, 999.006
See application file for complete search history.

(56) References Cited

U.S. PATENT DOCUMENTS

| | | | |
|---|---|---|---|
| 7,546,601 B2 | 6/2009 | Byrd et al. | |
| 7,647,631 B2 | 1/2010 | Sima | |
| 7,707,075 B2 | 4/2010 | Vaughan et al. | |
| 2008/0235163 A1* | 9/2008 | Balasubramanian et al. | 706/12 |
| 2008/0270203 A1* | 10/2008 | Holmes et al. | 705/7 |
| 2008/0289047 A1* | 11/2008 | Benea et al. | 726/27 |
| 2009/0125516 A1* | 5/2009 | Schonfeld et al. | 707/6 |
| 2009/0216602 A1* | 8/2009 | Henderson | 705/9 |
| 2010/0076954 A1 | 3/2010 | Dulitz et al. | |

* cited by examiner

*Primary Examiner* — Alexey Shmatov
(74) *Attorney, Agent, or Firm* — Michael A. Springs

(57) ABSTRACT

A method includes receiving web page identifiers associated with a website and determining whether the web page identifiers identify redundant web pages of the website. One or more web page identifiers are removed from the web page identifiers that identify redundant web pages to create a group of web page identifiers. A user responsible for at least one of the web pages identified in the group of web page identifiers is determined. A risk level is determined for each of the web pages identified in the group based on a plurality of risk factors, the user is associated with the risk level, and the association between the user and the risk level is stored in a database.

22 Claims, 6 Drawing Sheets

MANAGEMENT OF AN INVENTORY OF WEBSITES

TECHNICAL FIELD OF THE INVENTION

This invention relates to websites and more specifically, to management of an inventory of websites.

BACKGROUND OF THE INVENTION

Entities utilize websites to provide information, services, and content to users. Because of increased use of websites, the size and complexity of websites has also increased, which further complicates management of multiple websites.

SUMMARY OF THE DISCLOSURE

In accordance with the teachings of the present disclosure, disadvantages and problems associated with previous websites can be reduced or eliminated.

According to one embodiment of the present disclosure, a method includes receiving web page identifiers associated with a website and determining whether the web page identifiers identify redundant web pages of the website. One or more web page identifiers are removed from the web page identifiers that identify redundant web pages to create a group of web page identifiers. A user responsible for at least one of the web pages identified in the group of web page identifiers is determined. A risk level is determined for each of the web pages identified in the group based on a plurality of risk factors, the user is associated with the risk level, and the association between the user and the risk level is stored in a database.

Certain embodiments of the present disclosure may provide one or more technical advantages. A technical advantage includes managing an inventory of websites. Another technical advantage may include reducing or eliminating instances in which viewers of a website see out-of-date information. Tracking the identity of who is in charge of web pages in websites may increase the ability to update and/or track content of websites. A benefit may include assigning risk to web pages in websites, which may help identify and address problems with websites while conserving resources and/or reducing cost. Another benefit may be to provide historical information associated with websites. Still another benefit may include viewing and/or managing inventory information associated with websites on a graphical user interface.

Certain embodiments of the present disclosure may include none, some, or all of the above technical advantages. One or more other technical advantages may be readily apparent to one skilled in the art in view of the figures, descriptions, and claims of the present disclosure.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Embodiments of the present invention and its advantages are best understood by referring to FIGS. 1 through 5, wherein like numerals refer to like and corresponding parts of the various drawings.

Figure 1:
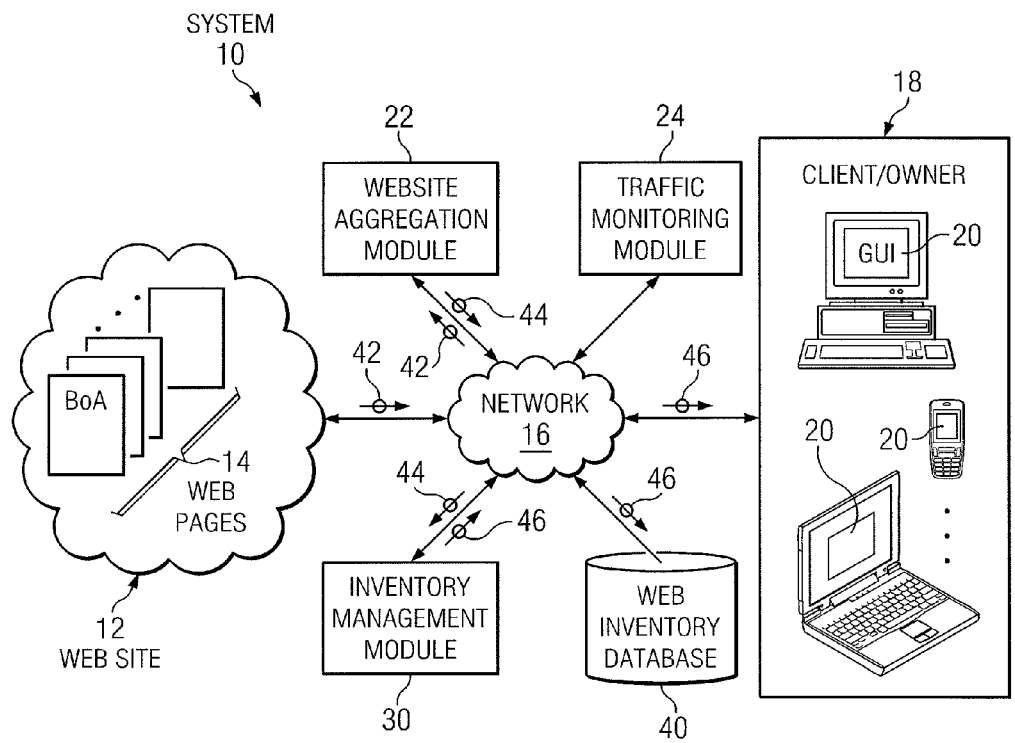
FIG. 1 is a block diagram illustrating an exemplary embodiment of a system for management of an inventory of websites.

FIG. 1 is a block diagram illustrating an exemplary embodiment of a system 10 for management of an inventory of websites. System 10 includes a website 12 that may include multiple web pages 14 capable of being viewed over network 16 by a client 18. Website aggregation module (WAM) 22 and traffic monitoring module (TMM) 24 may be capable of analyzing website 12 for information about web pages 14. Inventory management module (IMM) 30 may use the information provided by WAM 22 and TMM 24 to maintain a web inventory database (WID) 40. IMM 30 may also present information from WID 40 to client 18.

Business entities have increasingly relied on the world wide web to communicate information with various entities such as clients, customers, vendors, and/or business partners. The web also facilitates conducting business and providing web-based business processes. As use of the web has increased, websites associated with business entities have become complex and the number of websites has increased. As more web pages are added to websites, it becomes difficult to maintain the websites. For example, business entities may have difficulty keeping their websites current and may encounter maintenance issues, such as out-dated links to information and/or out-of-date content. Using conventional techniques, such issues may be costly to identify and/or address. The teachings of the present disclosure recognize that it would be desirable to provide a system and method for management of an inventory of websites to minimize and/or avoid problems associated with maintaining websites.

Website 12 represents any suitable combination of documents, web pages 14, and content operable to present information, receive information, and/or provide business applications and/or services to client 18. Website 12 may include a home page that provides links to other web pages 14 of website 12. In some embodiments, website 12 may be associated with a particular domain name. Alternatively or in addition, website 12 may be associated with one or more domain names. For example, website 12 may represent a collection of web pages 14 associated with a business entity and/or commercial enterprise. In various embodiments, one or more domain names may be associated with particular aspects of that business entity and/or commercial enterprise.

Web pages 14 each represent a document associated with website 12 that is viewable over network 16 by a user of client 18. Web pages 14 may include static and/or dynamic web addressable content. For example, web pages 14 may include scripts and/or instructions to display text and/or graphics, to exchange information, and/or to dynamically respond to user input. In some embodiments, one or more web pages 14 may represent an application that provides services and/or applications over the web. In some embodiments, aspects of applications provided by web pages 14 are executed by scripts, programming instructions, and/or code. Each of web pages 14 may be associated with a particular web page identifier 42. For example, web page identifier 42 may include a uniform resource locator (URL) string. A URL may represent an internet address that includes an access protocol and a domain name. The access protocol and domain name may identify one or more servers. A URL may also include a path identifying the location of web page 14 on a server identified by the access protocol and domain name. Additionally, a URL may include one or more parameters associated with scripts and/or instructions in the particular web page. By way of illustration only, an exemplary URL is provided below:

| http:// | www.web-site-a.com | /folder1/default.aspx | ?sessionid=x |
|---|---|---|---|
| (access protocol) | (domain name) | (path) | (parameter) |

In some embodiments, a website 12 may identify and/or organize content using various combinations of access protocols, domain names, and/or paths. Accordingly, content associated with a particular URL may be identified by analyzing the URL string associated with web page 14.

Network 16 represents any suitable network operable to facilitate communication between the components of system 10 such as website 12, clients 18, WAM 22, TMM 24, inventor manager 30, and/or WID 40. Network 16 may include any interconnecting system capable of transmitting audio, video, signals, data, messages, or any combination of the preceding. Network 16 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Client 18 represents any suitable combination of hardware, software, and controlling logic capable of communicating with website 12 and/or IMM 30 over network 16. Client 18 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10. A user of client 18 may interact with one or more web pages 14 on website 12. Additionally or in the alternative, a user of client 18 may communicate with IMM 30. Client 18 may represent any number of clients and/or users. Client 18 may also comprise a user interface, such as a display, a microphone, keypad, or other appropriate terminal equipment usable by a user. In the illustrated embodiment, client 18 includes a GUI 20.

GUI 20 represents any suitable graphical arrangement of information presented to the user and/or entered by a user of client 18. For example, GUI 20 may display information received from website 12 and/or IMM 30. GUI 20 is generally operable to tailor and filter data entered by and presented to the user. In some embodiments, GUI 20 may be displayed by a web browser associated with client 18. GUI 20 may provide the user with an efficient and user-friendly presentation of information. GUI 20 may comprise a plurality of displays having interactive fields, pull-down lists, and buttons operated by the user. GUI 20 may include multiple levels of abstraction including groupings and boundaries. It should be understood that the term GUI 20 may be used in the singular or in the plural to describe one or more GUIs 20 in each of the displays of a particular client 18. Examples of GUIs 20 generally operable to interact with IMM 30 and/or present information stored in WID 40 are presented in FIGS. 3A and 3B, which are described in greater detail below.

WAM 22 represents any suitable collection of hardware, software, and controlling logic operable to collect information about website 12 and provide the collected information to other components of system 10 for processing and analysis. For example, WAM 22 may collect web page identifiers 42 associated with website 12. WAM 22 may also periodically traverse website 12 to identify web pages 14 associated with website 12. WAM 22 transmits information, including web page identifiers 42, to IMM 30. In some embodiments, WAM 22 may create a file that includes a group 44 of the collected web page identifiers 42. In some embodiments, WAM 22 may be operable to communicate information, such as the previously mentioned file, to a server coupled to network 16 using a file transfer protocol (FTP). WAM 22 may collect and communicate information about any suitable number of websites 12. While illustrated as a separate module, it should be understood that WAM 22 may be included as a module in any suitable component of system 10, such as IMM 30 and/or TMM 24.

TMM 24 represents any suitable collection of hardware, software, and controlling logic operable to collect traffic information about website 12. For example, TMM 24 may monitor website 12 for user activity and determine the number of times each web page 14 is viewed by users of website 12. TMM may transmit information to IMM 30 that includes the traffic information. TMM 24 may also create a file that includes traffic information associated with web page identifier 42 for each web page 14 viewed by a user. In some embodiments, TMM 24 may be operable to communicate information, such as the previously mentioned file, to a server coupled to network 16 using FTP. In some embodiments, TMM 24 may calculate statistics associated with the use of website 12. While illustrated as a separate module, it should be understood that TMM 24 may be included as a module in any suitable component of system 10, such as IMM 30 and/or WAM 22.

IMM 30 represents any suitable combination of hardware, software, and controlling logic operable to maintain a WID 40 and communicate web inventory information and/or other information for display on GUI 20 of client 18. IMM 30 may include a network server, any suitable remote server, a mainframe, a host computer, a workstation, a web server, a personal computer, a file server, or any other suitable device operable to communicate with clients 18, WAM 22, TMM 24, or website 12 and process data. In some embodiments, IMM 30 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of IMM 30 may be performed by any suitable combination of one or more servers or other components at one or more locations. In the embodiment where the module is a server, the server may be a private server, and the server may be a virtual or physical server. The server may include one or more servers at the same or remote locations. Also, IMM 30 may include any suitable component that functions as a server. An exemplary embodiment of IMM 30 is described in greater detail with respect to FIG. 2 below.

WID 40 represents any suitable database operable to store, either permanently or temporarily, information related to the management of website 12. In various embodiments, WID 40 may include an up-to-date inventory of web pages 14 in website 12 and/or may associate a risk level and a user responsible for the content of each web page 14. In some embodiments, database 40 may be a relational database, such as a structured query language (SQL) database. WID 40 includes any one or a combination of volatile or non-volatile local or remote devices suitable for storing information. For example, WID 40 may include random access memory (RAM), read only memory (ROM), magnetic storage devices, optical storage devices, or any other suitable information storage device or combination of these devices. WID 40 may include any suitable number and configuration of data structures necessary to store web inventory information, examples of which will be described in greater detail with respect to FIG. 3 below. While WID 40 is illustrated as a separate module, WID 40 may be included in IMM 30, a network storage server, a storage area network (SAN), and/or any appropriate component of system 10.

In an exemplary embodiment of operation, IMM 30 communicates with the various elements of system 10 to manage an inventory of websites 12 in WID 40. IMM 30 may receive information collected by WAM 22 and/or TMM 24. In the illustrated embodiment, WAM 22 collects web page identifier 42 from website 12. WAM 22 collects a plurality of website identifiers 42 and communicates a group 44 of web page identifiers 42 to IMM 30. IMM 30 processes group 44 of web page identifiers 42 to facilitate management of websites 12. IMM 30 may then communicate the processed information 46 to WID 40 and/or client 18. Another exemplary embodiment of operation of IMM 30 is described in more detail with respect to FIG. 2 below.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 10 and the components within system 10.

Modifications, additions, or omissions may be made to system 10 without departing from the scope of the invention. For example, WAM 22 and/or TMM 24 may continuously provide updates to IMM 30 as they are detected in website 12. IMM 30 may maintain web inventory for any number of websites 12. As another example, IMM 30 may be included as a component of website 12 and/or may store web pages 14 used to display WID 40 information to client 18 on GUI 20. Additionally system 10 may include any number of networks 16, WAMs 22, TMMs 24, IMMs 30, and/or WIDs 40.

Figure 2:
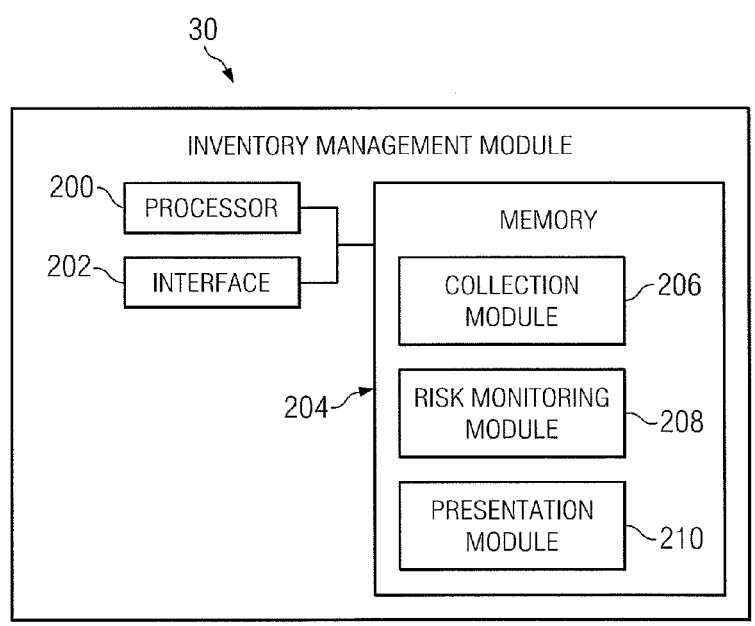
FIG. 2 is a block diagram illustrating an exemplary embodiment of an inventory management module.

FIG. 2 is a block diagram illustrating an exemplary embodiment of IMM 30. IMM 30 communicates with the various components of system 10 to manage a web inventory in WID 40 and present information to client 18. As illustrated, IMM 30 includes a processor 200, interface 202, memory 204, information collection module 206, risk identity module 208, and presentation module 210. IMM 30 also may be coupled to WID 40.

Processor 200 communicatively couples to interface 202, memory 204, and WID 40, and controls the operation and administration of IMM 30 by processing information received from interface 202, memory 204, and WID 40. Processor 200 includes any hardware and/or software that operates to control and process information. For example, processor 200 may process information from collection module 206, risk identity module 208, and/or presentation module 210 to control the operation of IMM 30. Processor 200 may be a programmable logic device, a microcontroller, a microprocessor, any suitable processing device, or any suitable combination of the preceding.

Interface 202 represents any suitable device operable to receive information from network 16, transmit information through network 16, perform processing of information, communicate to other devices, or any combination of the preceding. For example, interface 202 receives information from WAM 22, TMM 24, and/or an FTP server. As another example, network interface 202 may communicate updates to WID 40 and/or communicate information to client 18. Interface 202 represents any port or connection, real or virtual, including any suitable hardware and/or software, including protocol conversion and data processing capabilities, to communicate through a LAN, WAN, SAN, and/or other communication system that allows IMM 30 to exchange information with network 16, clients 18, WAM 22, TMM 24, website 12, or other components of system 10.

Memory 204 stores, either permanently or temporarily, data, operational software, or other information for processor 30. Memory 204 includes any one or a combination of volatile or non-volatile local or remote devices suitable for storing information. For example, memory 204 may include RAM, ROM, magnetic storage devices, optical storage devices, or any other suitable information storage device or a combination of these devices. Memory 204 may include any suitable information for use in the operation of IMM 30. Memory 204 may store collection module 206, risk monitoring module 208, and/or presentation module 210.

Collection module 206, risk monitoring module 208, and presentation module 210 represent logic, rules, algorithms, code, tables, and/or other suitable instructions for performing the described functions and operations of IMM 30. Collection module 206 may include code to receive and/or retrieve information collected by WAM 22 and/or TMM 24. Collection module 206 may also process web page identifiers 42 and traffic information for use in the operations of IMM 30. Risk monitoring module 208 may identify web page content, identify responsible users, and/or assign risk based on any number and/or type of appropriate factors. Risk monitoring module 208 may store information 46 associated with website 12 and/or web pages 14 in WID 40. Presentation module 210 may retrieve information 46 from WID 40 and/or may facilitate presentation of information 46 to client 18. In some embodiments, presentation module 210 may communicate information 46 to responsible users based on risk associated with one or more web pages 14. While illustrated as collection module 206, risk monitoring module 208, and presentation module 210, it should be understood that the functions of IMM 30 may be performed by any suitable combination of hardware, software, and/or controlling logic. For example, collection module 206, risk identity module 208, and presentation module 210 may represent functionality of a single application program of IMM 30.

In an exemplary embodiment of operation, IMM 30 manages an inventory of website 12 and/or presents information to client 18. IMM 30 may maintain WID 40 by updating the database with current information 46 related to website 12. IMM 30 may provide information to client 18 about website 12.

WAM 22 collects information about website 12. WAM 22 communicates the collected information to IMM 30 for processing. The information collected by WAM 22 may include web page identifiers 42 representing web pages 14. These web page identifiers 42 may identify the web pages 14 associated with website 12 in a given time period. In some embodiments, WAM 22 may transmit a file that includes group 44 of web page identifiers 42 to IMM 30. In some embodiments, web page identifiers 42 and/or updates to the previously sent web page identifiers 42 may be provided at predetermined time intervals, on demand, or automatically upon a predetermined event. When IMM 30 receives the web page identifiers 42, collection module 206 begins to update WID 40 with received web page identifiers 42. Alternatively or in addition, WAM 22 may upload a file that includes web page identifiers 42 to an FTP server. Collection module 206 may continuously and/or periodically monitor the FTP server for updates from WAM 22. When collection module 206 detects a file on the FTP site, IMM 30 may begin updating WID 40 with information from the file. In some embodiments collection module 206 may periodically request updates from WAM 22.

TMM 24 collects traffic information about website 12, which may include traffic information associated with web pages 14. In some embodiments, TMM 24 may collect traffic information based on web page identifiers 42 collected by WAM 22. TMM may communicate traffic information to IMM 30 in a similar manner as previously described with respect to WAM 22.

Collection module 206 processes the collected information from WAM 22 and/or TMM 24. For example, in various embodiments, multiple web page identifiers 42 may identify the same web page 14 and/or web pages 14 with the same content. Collection module 206 may determine whether web page identifiers 42 identify redundant web pages 14 of the website 12 and remove redundant web page identifiers 42 to create a group 44 of unique web page identifiers 42. In an exemplary embodiment for removing redundant web page identifiers 42, collection module 206 may remove redundant web page identifiers 42 as follows. In some embodiments, a URL string included in a given web page identifier 42 may include parameters associated with instructions and/or scripts of web page 14. These parameters may not identify unique content of web page 14. Collection module 206 may determine which parameters do not identify unique content and/or may store rules regarding the identification of such parameters. When web page identifiers 42 are received from WAM 22, collection module 206 may analyze the web page identifiers 42 for these parameters. When such redundant parameters are identified in the URL string, the URL string in each web page identifier 42 may be modified to remove the redundant parameters. Collection module 206 may then compare modified web page identifiers 42 and may remove any redundant web page identifiers 42. Once redundancies are removed, collection module 206 may create a group 44 of web page identifiers 42 for further processing by, for example, risk monitoring module 208. In addition or in the alternative, collection module 206 may associate traffic information from TMM 24 with each web page identifier 42 entry in the group 44 of web page identifiers 42.

Collection module 206 also determines a content type of web pages 14 identified by web page identifiers 42. In some embodiments, collection module 206 determines a content type according to web page identifiers 42 by, for example, analyzing the web page identifiers 42 received from WAM 22. In an exemplary embodiment for determining a content type of web page identifiers 42, collection module 206 may associate web content types with corresponding elements of URL strings in the web page identifiers 42. For example, the domain name, path names, and/or parameters in URL strings may correspond to content of web pages 14 in website 12. Collection module 206 may determine which domain names, path names, and/or parameters that correspond to various content types and/or store rules regarding the association of URL string elements and content types. Collection module 206 may analyze the URL string for URL string elements that may be associated with various content types. Thus, collection module 206 may associate a content type with each of the web identifiers in the group.

Risk monitoring module 208 may analyze information associated with web pages 14 to determine information about web pages 14, such as responsible users and risk levels. Risk monitoring module 208 may analyze information received from WAM 22, TMM 24, and/or collection module 206. In some embodiments, collection module 206 communicates a group 44 of web page identifiers 42 to risk monitoring module 208 for analysis. Risk monitoring module 208 may update WID 40 based on the analyzed information 46.

Risk monitoring module 208 may determine a responsible user for each of the web page identifiers 42. A responsible user may be one or more persons and/or a group associated with website 12 that is responsible for the content of one or more web pages 14. In some embodiments, responsible users may be referred to as owners. Risk monitoring module 208 may associate responsible users with corresponding content types and/or may store rules regarding the association of users with content types. Risk monitoring module 208 may determine a responsible user based on the content type of the web pages 14 identified by collection module 206. Users may be assigned based on any number of factors, such as experience, technical knowledge, business unit, or other appropriate factors. Risk monitoring module 208 may then associate the determined user with the web page identifier(s) 42 for which that user is responsible.

Risk monitoring module 208 may evaluate each of web page identifiers 42 for risk. Risks may include legal risks, business and/or reputation risks, customer experience risks, regulatory risks and/or any number and type of appropriate risks that may be associated with websites. Risk monitoring module 208 may analyze various risk factors about web page identifiers 42 such as traffic level, web page location, web page content, and/or the last time the page was updated. Based on its analysis, risk monitoring module 208 may assign a risk level to each of web page identifiers 42 and/or associated responsible users. For example, web page 14 that has a high traffic level may be associated with a higher degree of risk than web page 14 with a lower traffic level. As another example, web page 14 that is prominently featured as a link on the home page of the website 12 may have a higher degree of risk than web page 14 that is several links away from the home page and/or embedded within website 12. As another example, web page 14 with certain types of content such as limited time offers or other time-sensitive material may be associated with a higher degree of risk than web page 14 that is relatively more static in nature.

Risk monitoring module 208 updates various fields of records and/or data structures in WID 40. Risk monitoring module 208 may associate each web page identifier 42 with a traffic level, content type, responsible owner, and/or risk level and store the association 46 in WID 40. An example of data structures stored within WID 40 is described with respect to FIG. 3 below.

Risk monitoring module 208 may determine whether to communicate web page identifier 42 to the responsible user. In some embodiments, Risk monitoring module 208 may make this determination based on an assigned risk level. For example, risk monitoring module 208 may store a predetermined risk level. When web page 14 reaches the predetermined risk level, risk monitoring module 208 may trigger a request for the responsible user to review the associated web page 14. Presentation module 210 may then send information 46 regarding web page 14 to client 18. Accordingly, presentation module 210 may transmit the request and/or the appropriate web page identifier 42 to the responsible user. Upon review, the user may perform various tasks associated with web page 14, such as updating web page 14 and/or marking web page 14 for deletion.

Presentation module 210 may facilitate the display of GUI 20 of web inventory information 46 in WID 40 to a user of client 18, examples of which are described in greater detail with respect to FIGS. 4A and 4B below. For example, in response to a user selection, presentation module 210 may facilitate presentation of a chart that illustrates a historical risk trend over a configurable time period based at least on the stored risk levels of the plurality of web page identifiers 42. Alternatively or in addition, presentation module 210 may facilitate the display of a chart illustrating an inventory size trend over a configurable time period based at least on the stored web page identifiers 42 and/or stored information 46. In some embodiments, presentation module 210 may facilitate displaying the association 46 of each web page identifier 42 stored in inventory database 40. In some embodiments, presentation module 210 may perform an inventory reconciliation report, in which differences between successive scans of website 12 are displayed. For example, an inventory reconciliation report may include unexpected additions and/or deletions of web pages 14 from website 12 and/or may track whether expected web page 14 deletions and/or retirements have been performed.

Modifications, additions, or omissions may be made to IMM 30. For example, risk monitoring module 208 may assign any number and type of risk levels and/or may take various actions based on the risk levels, such as notifying a manager of the responsible user. As another example, risk monitoring module 208 may require input from the responsible user confirming review of web page 14 within a given amount of time. Risk monitoring module 208 may log the results of the responsible user's review in an appropriate record of WID 40. If a review confirmation is not received within the requested time, risk management module 208 may initiate an escalation process to ensure the review of web page 14 is performed. Additionally or alternatively, IMM 30 may track defect and/or error reports associated with web pages 14 of website 12.

Figure 3:
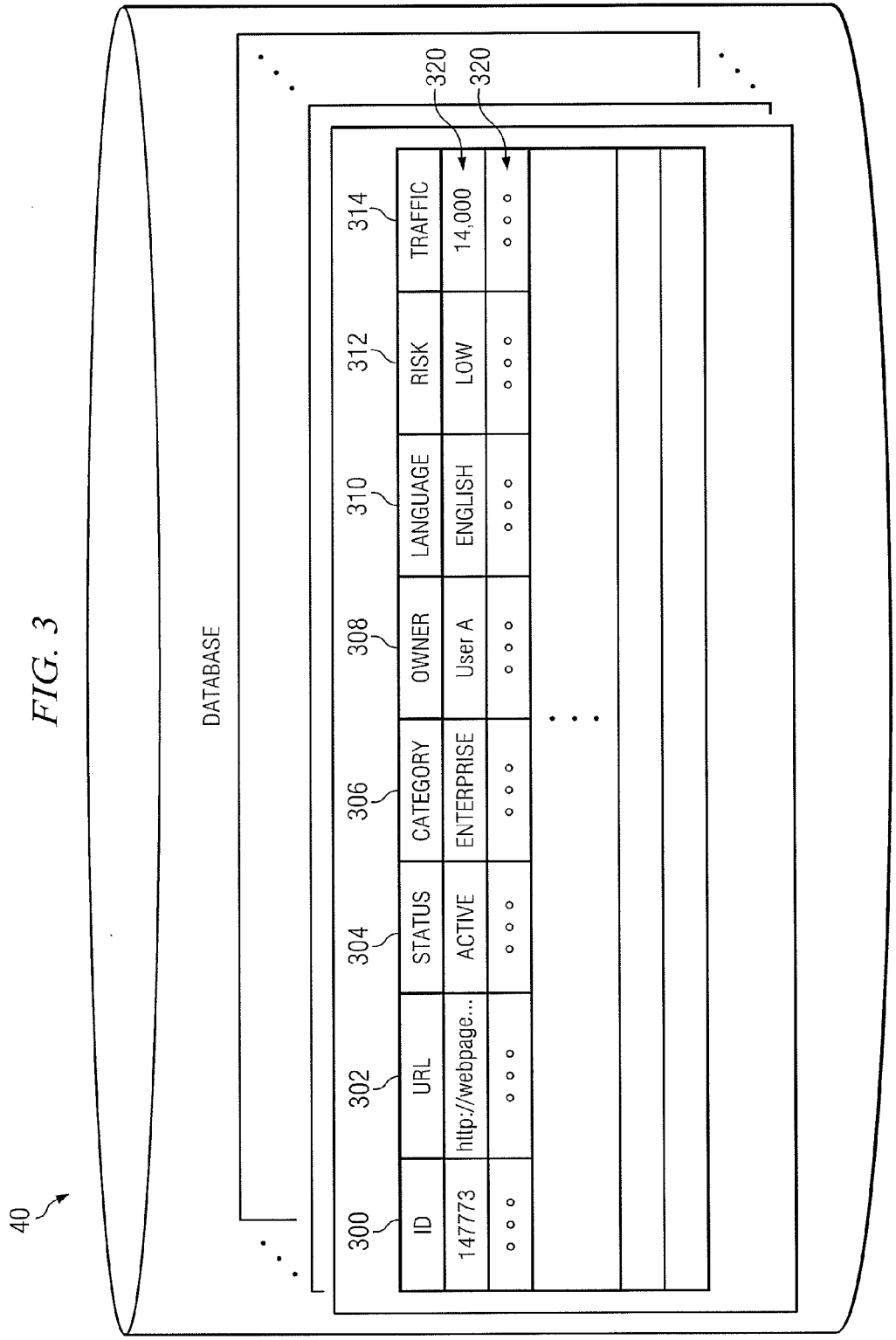
FIG. 3 is an exemplary embodiment of a database that stores an inventory of websites.

FIG. 3 is an exemplary embodiment of WID 40 that stores an inventory of websites 12. WID 40 may be managed by IMM 30, which stores records 320 including information about web pages 14 in website 12. Each record 320 may have any suitable, configurable number and type of fields to store information associated with a web page 14.

In some embodiments, each record 320 of web page 14 information may include the following fields: Identifier 300, URL 302, status 304, category 306, owner 308, language 310, risk 312, and traffic 314. Identifier 300 represents a numerical identification that may be assigned to each web page 14, which may aid WID 40 in tracking each web page 14 in website 12. URL 302 represents the URL of web page 14. In some embodiments, URL 302 represents web page identifier 42. Status 304 represents the status of the web page 14. For example, status 304 of web page 14 may include active, retired, set for retirement, updated, or any other appropriate status. Category 306 represents the category assigned to web page 14. For example, category 306 may indicate the type of content on web page 14. Owner 308 represents the user assigned as responsible for web page 14. The user may be an individual or group of individuals who may be responsible for web page 14. Language 310 represents the language of the content of web page 14. Language 310, for example, may be used by IMM 30 to facilitate determining an owner 308 and/or risk 312. Risk 312 represents the risk level associated with web page 14. Traffic 314 represents the traffic level according to the number of page views for web page 14.

WID 40 may store records 320 by date, such that WID 40 may keep historical information related to the web inventory of website 12. GUI 20 of client 18 may display information from WID 40 according to the teachings of the present disclosure.

Modifications, additions, or omissions may be made to WID 40. For example, WID 40 may include information from any suitable number and/or type of websites 12. As another example, WID 40 may represent a sample of a universal database. This sample provides a broad cross section of websites 12. As yet another example, any suitable component within system 10 may include WID 40. Records 320 of WID 40 may include more fields or fewer fields as appropriate to implement the teachings of the present disclosure. For example, WID 40 may include fields that correlate to the information presented below with respect to FIGS. 4A and 4B.

Figure 4A:
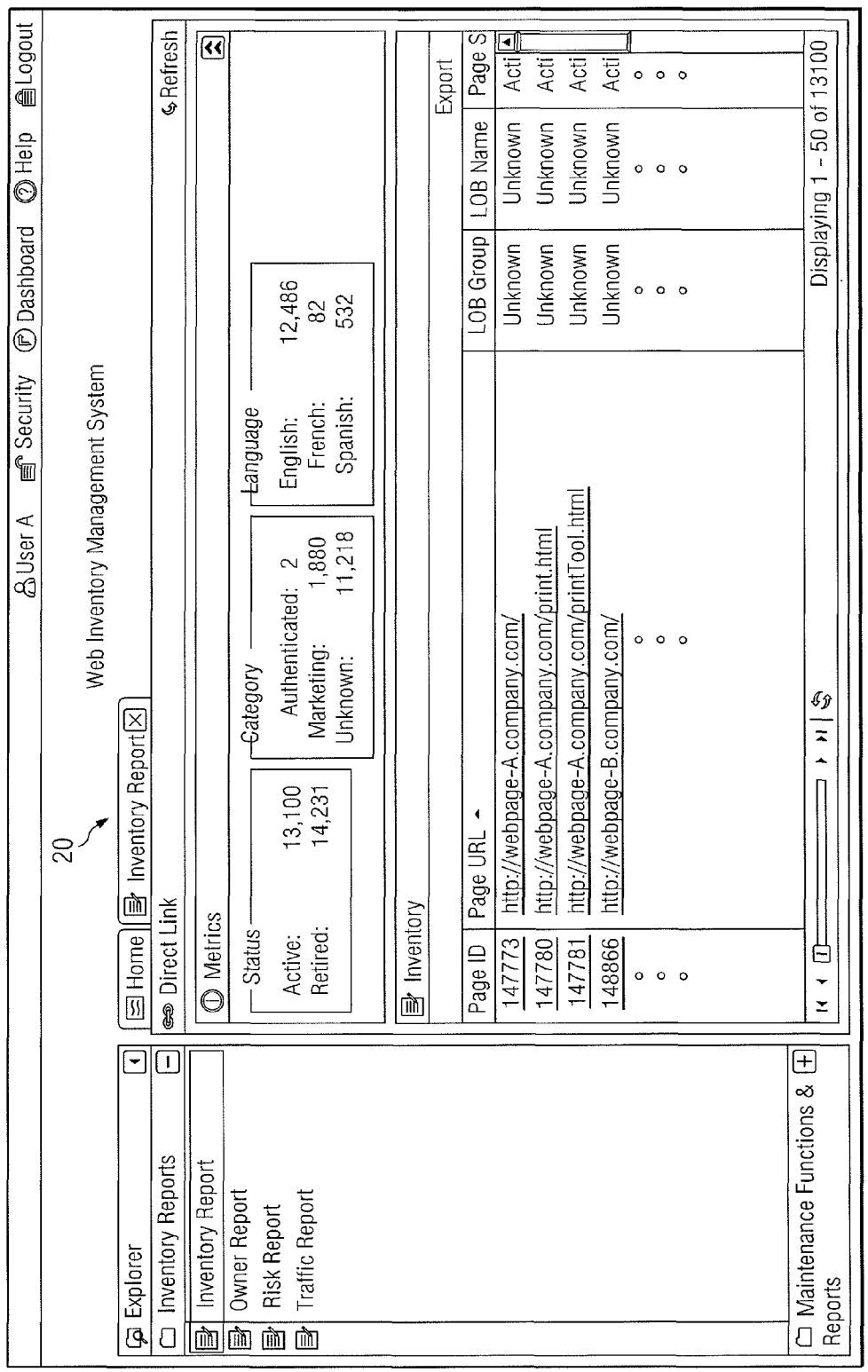
FIGS. 4A and 4B illustrate example graphical user interfaces according to various embodiments.
Figures 1, 4B:
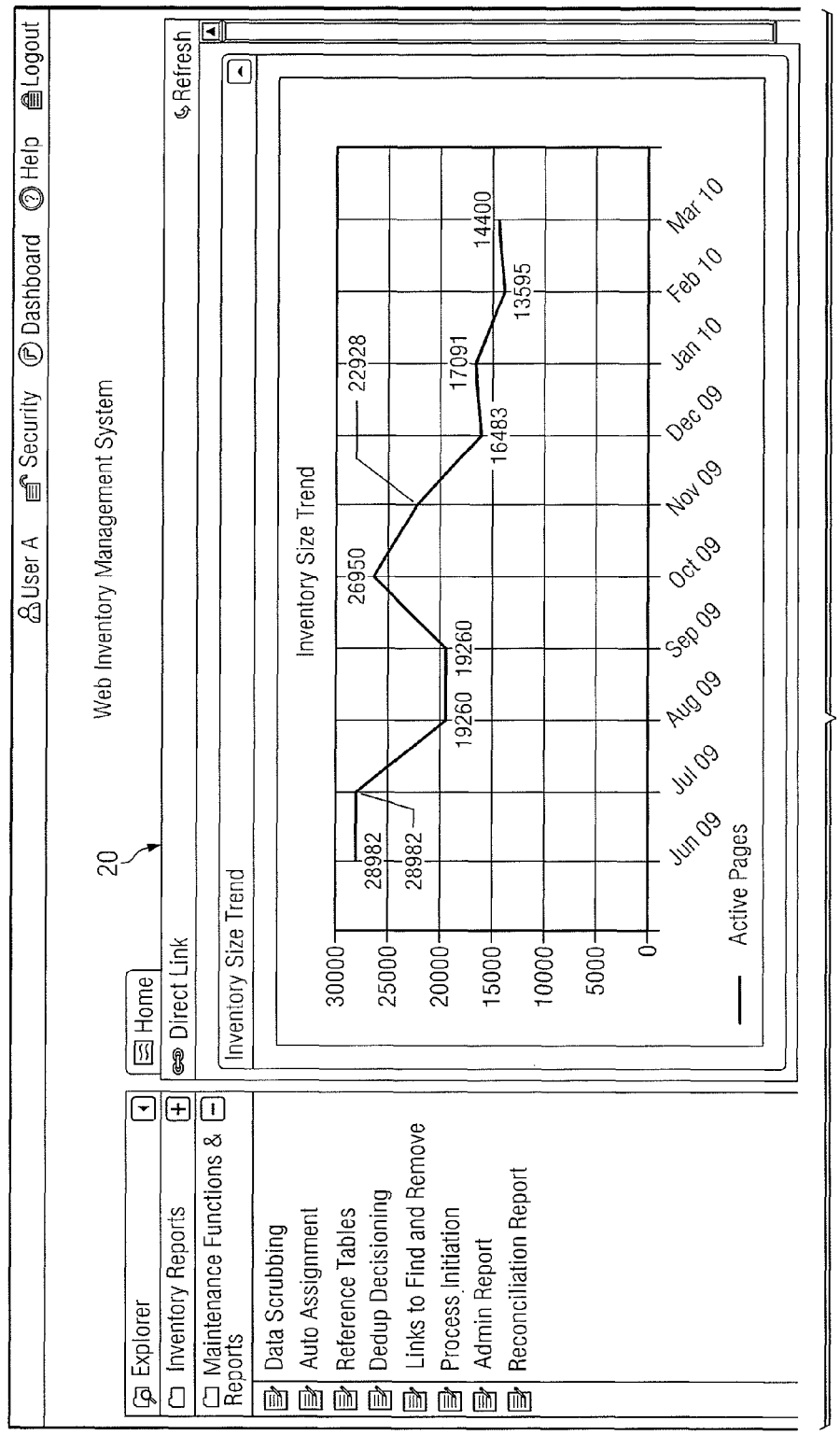
Figures 2, 4B:
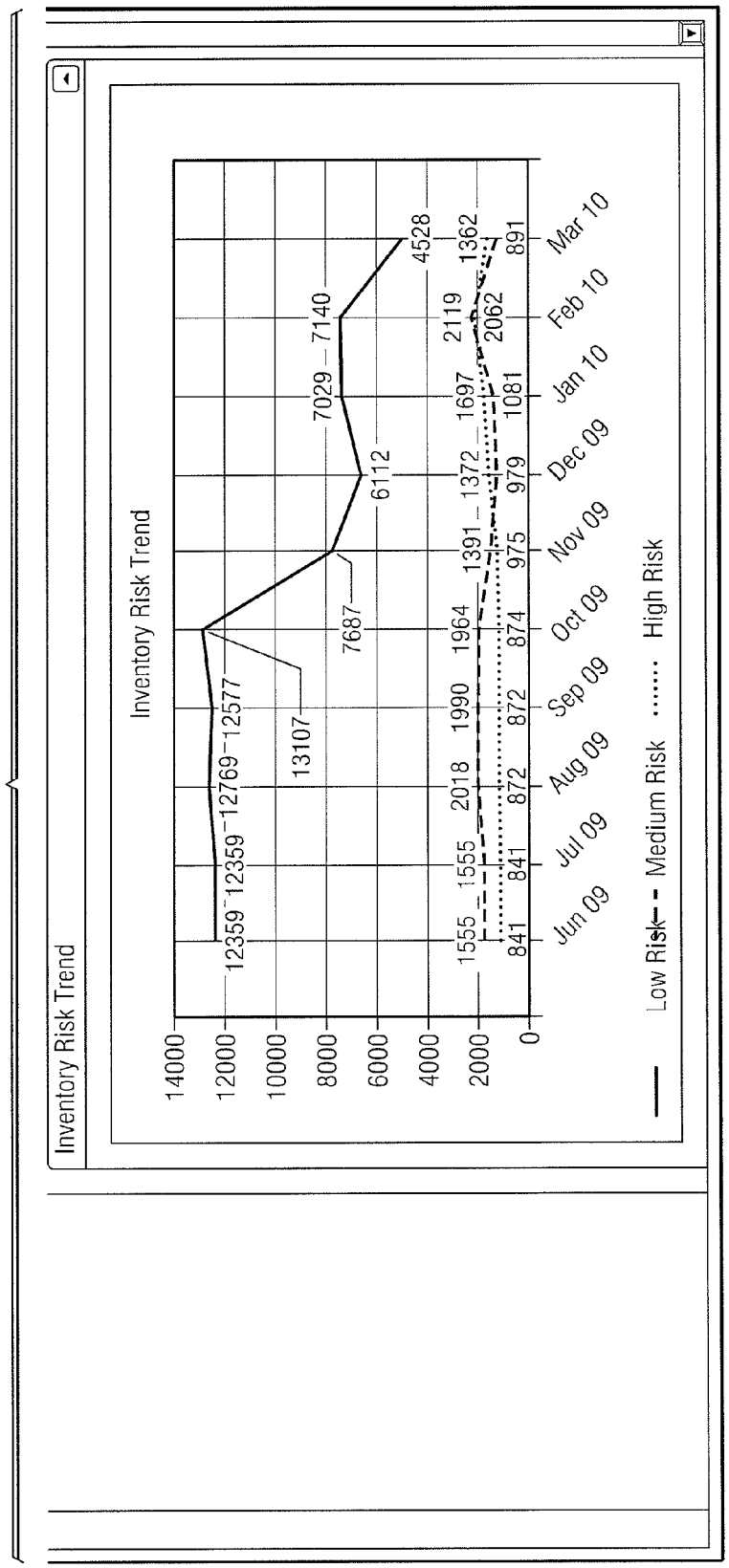

FIGS. 4A and 4B illustrate example GUIs 20 according to various embodiments. In this example, FIGS. 4A and 4B are example web user interfaces. These example web user interfaces may receive any suitable information, including but not limited to information from WID 40. The web user interfaces present options for user input, which may allow a user of client 18 to manipulate and/or select the displayed data. Accordingly, GUI 20 may present views and/or reports of information from WID 40.

For example, a user of client 18 may sort the presented information from WID 40 by clicking a column header such as "Page URL" as illustrated in FIG. 4A. The information presented is not limited to the data listed under "Inventory" on FIG. 4A. Instead, a user may run various reports such as an "Owner Report," a "Risk Report," a "Traffic Report," and/or the illustrated "Inventory Report." Each report may present information to a user, such as any of the previously described data stored in WID 40. As another example, GUI 20 may present charts and/or graphs of historical information related to website 12. A user of client 18 may select an appropriate chart and/or graph for viewing.

As illustrated in FIG. 4B, GUI 20 presents an "Inventory Size Trend" that shows a historical view of the number of active web pages 14 in website 12 over a configurable time period. GUI 20 also presents an "Inventory Risk Trend" that shows a historical view of the number of web pages 14 in website 12 categorized as either "Low Risk," "Medium Risk," or "High Risk" over a configurable time period.

It should be understood that the scope of the present disclosure is not limited to GUIs 20 illustrated by FIGS. 4A and 4B, and these figures are merely examples of the manner in which information from WID 40 may be presented and/or viewed.

Figure 5:
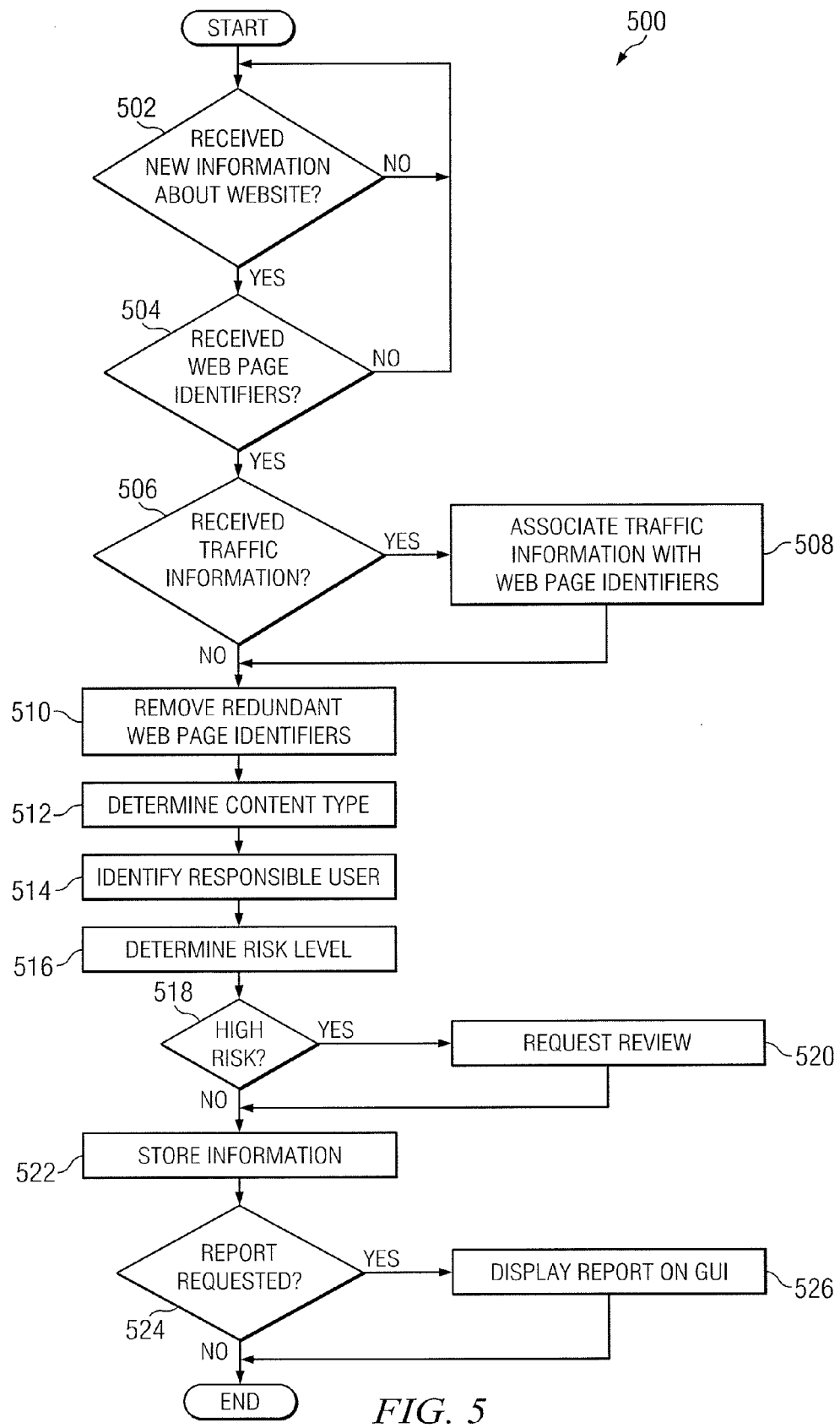
FIG. 5 is a flowchart illustrating an exemplary method for managing an inventory of websites.

FIG. 5 is a flowchart illustrating an exemplary method 500 for managing an inventory of websites. The method begins at step 502, where IMM 30 determines whether it has received new information about website 12. IMM 30 may receive the new information from, for example, WAM 22 and/or TMM 24. IMM 30 may monitor continuously and/or periodically check for new information. In some embodiments, IMM 30 may monitor an FTP server for new information. When new information is detected, IMM 30 initiates the process of updating WID 40.

At step 504, a determination is made whether the received information includes web page identifiers 42. If no web page identifiers 42 have been received, for example, from WAM 22, the process returns to step 502. If web page identifiers 42 have been received, the method determines at step 506 whether traffic information has been received. Traffic information may be received, for example, from TMM 24. If traffic information has not been received, the process continues to step 510. If traffic information has been received, however, at step 508 the traffic information is associated with web page identifiers 42 before the process continues to step 510.

At step 510, redundant web page identifiers 42 are removed. Then, at step 512, a content type associated with each web page identifier 42 is determined. Based on the content type, a responsible user for each web page identifier 42 is identified at step 514.

At step 516, a risk level for each web page identifier 42 is determined. The risk level may be based on the content type, the traffic information, and other factors as previously described. If, at step 522, the risk level for any given web page 14 reaches a predetermined threshold, such as a "high risk" threshold, the process continues to step 524 where the responsible owner is requested to review web page 14. While method 500 as illustrated requests review at a "high risk" threshold, the scope of the present disclosure encompasses notification of any appropriate risk levels. For example, a responsible user may receive a report of the different risks of all web pages 14 for which the user is responsible. In addition or in the alternative, a responsible user may be requested to take various appropriate actions based on the risk level, which may include review within predetermined time periods. For example, a responsible user may be requested to immediately review a high risk web page 14 and/or may be requested to review a medium risk web page 14 within a predetermined number of days and/or weeks.

At step 522, IMM 30 communicates information to WID 40. These updates may include the information associated with each web page identifier 42 determined by method 500, such as the traffic information associated in step 510, the content types determined in step 514, and/or the responsible users identified at step 516. For example, new records may be created for any new web page identifiers 42 and/or appropriate fields of records for existing web page identifiers 42 may be updated.

At step 524, a determination is made whether client 18 requests information from WID 40. Client 18 may, at any point in the process, request such information, and responses to such requests similarly may be fulfilled at any point. If a report has been requested, at step 526, IMM 30 communicates information 46 for display. For example, GUI 20 may display information 46 on client 18. If no report is requested at step 524 or after the report is displayed at step 526, method 500 ends.

Modifications, additions, or omissions may be made to method 500 illustrated in the flowchart of FIG. 5. For example, method 500 may process several requests for access to data at once and/or in parallel. As another example, records of WID 40 may be updated as part of each step and/or may be updated once at the end of the update process. Furthermore, method 500 may assign any number and appropriate levels of risks on any appropriate scale. Additionally, the steps of FIG. 5 may be performed in parallel or in any suitable order.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method comprising:
   receiving a plurality of web page identifiers associated with a website;
   determining whether the web page identifiers identify redundant web pages of the website;
   removing one or more web page identifiers from the plurality of web page identifiers that identify redundant web pages to create a group of web page identifiers;
   using the plurality of web page identifiers to maintain an inventory of a plurality of web pages of a business entity's website;
   determining, by a processor, a user responsible for evaluating a risk level of the content of the at least one web page in the inventory of the plurality of web pages of the business entity's website, the evaluating including reviewing the content of at least one of the web pages identified in the group of web page identifiers, wherein the content of the web page presents business information about the business entity and the risk level indicates a risk to the business entity associated with the business entity's website;
   determining the risk level for each of the web pages identified in the group based on a plurality of risk factors;
   associating the user and the risk level; and
   storing the association between the user and the risk level in a database.

2. The method of claim 1, further comprising:
   determining whether to communicate the at least one web page identifier to the user based at least in part on the associated risk level.

3. The method of claim 1, further comprising:
   facilitating display of a selected one of:
      a chart illustrating a historical risk trend over a configurable time period based at least on the risk level of each of the plurality of web page identifiers; and
      a chart illustrating an inventory size trend over a configurable time period based at least on the web page identifiers.

4. The method of claim 1, further comprising:
   determining traffic data for each web page; and
   associating the web page traffic data with each of the web page identifiers.

5. The method of claim 1, wherein the plurality of risk factor includes one or more of the following: traffic data associated with the web page; a location of the web page; and content of the web page.

6. The method of claim 1, wherein each of the web page identifiers comprises a uniform resource locator (URL) string that includes one or more parameters and determining whether the web page identifiers identify redundant web pages of the website further comprises:
   determining whether the one or more parameters identify unique content;
   modifying the web page identifiers to remove parameters that do not identify unique web pages of the website; and
   comparing the modified web page identifiers to identify redundant web page identifiers.

7. The method of claim 1, wherein determining a user responsible for at least one of the web pages identified in the group of web page identifiers further comprises:
   determining content of the web page according to the web page identifier;

determining a user associated with the determined content; and associating the determined user with the web page identifier.

8. The method of claim 1, wherein the user is assigned responsibility for reviewing the content of at least one of the web pages identified in the group of web page identifiers.

9. The method of claim 1, wherein the risk level measures a risk associated with the website, the risk comprising one or more of a legal risk, a business risk, a reputation risk, a consumer experience risk, and a regulatory risk.

10. A non-transitory computer readable medium comprising logic, the logic, when executed by a processor, operable to:
   receive a plurality of web page identifiers associated with a website;
   determine whether the web page identifiers identify redundant web pages of the website;
   remove one or more web page identifiers from the plurality of web page identifiers that identify redundant web pages to create a group of web page identifiers;
   use the plurality of web page identifiers to maintain an inventory of a plurality of web pages of a business entity's website;
   determine a user responsible for evaluating a risk level of the content of the at least one web page in the inventory of the plurality of web pages of the business entity's website, the evaluating including reviewing the content of at least one of the web pages identified in the group of web page identifiers, wherein the content of the web page presents business information about the business entity and the risk level indicates a risk to the business entity associated with business entity's website;
   determine the risk level for each of the web pages identified in the group based on a plurality of risk factors;
   associate the user and the risk level; and
   store the association between the user and the risk level in a database.

11. The computer readable medium of claim 10, the logic further operable to:
   determine whether to communicate the at least one web page identifier to the user based at least in part on the associated risk level.

12. The computer readable medium of claim 10, the logic further operable to:
   facilitate display of a selected one of:
      a chart illustrating a historical risk trend over a configurable time period based at least on the risk level of each of the plurality of web page identifiers; and
      a chart illustrating an inventory size trend over a configurable time period based at least on the web page identifiers.

13. The computer readable medium of claim 10, the logic further operable to:
   determine traffic data for each web page; and
   associate the web page traffic data with each of the web page identifiers.

14. The computer readable medium of claim 10, wherein the plurality of risk factor includes one or more of the following: traffic data associated with the web page; a location of the web page; and content of the web page.

15. The computer readable medium of claim 10, wherein each of the web page identifiers comprises a URL string that includes one or more parameters and the logic operable to determine whether the web page identifiers identify redundant web pages of the website is further operable to:
   determine whether the one or more parameters identify unique content;
   modify the web page identifiers to remove parameters that do not identify unique web pages of the website; and
   compare the modified web page identifiers to identify redundant web page identifiers.

16. The computer readable medium of claim 10, wherein the logic operable to determine a user responsible for at least one of the web pages identified in the group of web page identifiers is further operable to:
   determine content of the web page according to the web page identifier;
   determine a user associated with the determined content; and
   associate the determined user with the web page identifier.

17. An apparatus comprising:
   an interface operable to receive a plurality of web page identifiers associated with a website; and
   a processor operable to:
      determine whether the web page identifiers identify redundant web pages of the website;
      remove one or more web page identifiers from the plurality of web page identifiers that identify redundant web pages to create a group of web page identifiers;
      use the plurality of web page identifiers to maintain an inventory of a plurality of web pages of a business entity's website;
      determine a user responsible for evaluating a risk level of the content of the at least one web page in the inventory of the plurality of web pages of the business entity's website, the evaluating including reviewing the content of at least one of the web pages identified in the group of web page identifiers, wherein the content of the web page presents business information about the business entity and the risk level indicates a risk to the business entity associated with the business entity's website;
      determine the risk level for each of the web pages identified in the group based on a plurality of risk factors;
      associate the user and the risk level; and
      store the association between the user and the risk level in a database.

18. The apparatus of claim 17, the processor further operable to:
   determine whether to communicate the at least one web page identifier to the user based at least in part on the associated risk level.

19. The apparatus of claim 17, the processor further operable to:
   facilitate display of a selected one of:
      a chart illustrating a historical risk trend over a configurable time period based at least on the risk level of each of the plurality of web page identifiers; and
      a chart illustrating an inventory size trend over a configurable time period based at least on the web page identifiers.

20. The apparatus of claim 17, the processor further operable to:
   determine traffic data for each web page; and
   associate the web page traffic data with each of the web page identifiers.

21. The apparatus of claim 17, wherein the plurality of risk factor includes one or more of the following:
   traffic data associated with the web page; a location of the web page; and content of the web page.

22. A system comprising:
means for receiving a plurality of web page identifiers associated with a website;
means for determining whether the web page identifiers identify redundant web pages of the website;
means for removing one or more web page identifiers from the plurality of web page identifiers that identify redundant web pages to create a group of web page identifiers;
means for using the plurality of web page identifiers to maintain an inventory of a plurality of web pages of a business entity's website;
means for determining a user responsible for evaluating a risk level of the content of the at least one web page in the inventory of the plurality of web pages of the business entity's website, the evaluating including reviewing the content of at least one of the web pages identified in the group of web page identifiers, wherein the content of the web page presents business information about the business entity and the risk level indicates a risk to the business entity associated with the business entity's website;
means for determining the risk level for each of the web pages identified in the group based on a plurality of risk factors;
means for associating the user and the risk level; and
means for storing the association between the user and the risk level in a database.

* * * * *